(12) United States Patent
Brossman

(10) Patent No.: US 7,235,197 B2
(45) Date of Patent: Jun. 26, 2007

(54) METHOD FOR PROCESS CONTROL OF MECHANICAL EMBOSSING TEXTURING

(75) Inventor: W. Craig Brossman, Terre Hill, PA (US)

(73) Assignee: AWI Licensing Company, Wilmington, DE (US)

( * ) Notice: Subject to any disclaimer, the term of this patent is extended or adjusted under 35 U.S.C. 154(b) by 152 days.

(21) Appl. No.: 10/292,990

(22) Filed: Nov. 13, 2002

(65) Prior Publication Data
US 2004/0012109 A1 Jan. 22, 2004

Related U.S. Application Data

(60) Provisional application No. 60/396,520, filed on Jul. 17, 2002.

(51) Int. Cl.
*B29C 45/76* (2006.01)
(52) U.S. Cl. .................. 264/40.1; 264/173.1
(58) Field of Classification Search ............ 264/173.1, 264/40.5, 40.1
See application file for complete search history.

(56) References Cited

U.S. PATENT DOCUMENTS

| | | | | |
|---|---|---|---|---|
| 3,915,090 A | * | 10/1975 | Horst et al. | 101/181 |
| 4,937,460 A | * | 6/1990 | Duncan et al. | 250/559.27 |
| 5,771,796 A | * | 6/1998 | Morrison et al. | 101/22 |
| 5,780,726 A | * | 7/1998 | Bastawros et al. | 73/105 |
| 5,961,903 A | * | 10/1999 | Eby et al. | 264/46.5 |
| 6,183,671 B1 | * | 2/2001 | Stauffacher et al. | 264/40.1 |
| 6,314,883 B1 | * | 11/2001 | Wech | 101/248 |
| 6,506,324 B1 | * | 1/2003 | Gerber | 264/40.1 |
| 6,613,256 B2 | * | 9/2003 | Brossman et al. | 264/46.4 |

* cited by examiner

*Primary Examiner*—Christina Johnson
*Assistant Examiner*—Monica A Huson

(57) ABSTRACT

Disclosed is both a method and apparatus for controlling and measuring an embossed texture on a decorative article. The embossed textured article includes both peaks and valleys that are measured and quantified to determine a profile of the textured article. Typically, the textured article comprises both chemically and mechanically embossed areas. The method uses moving average subtraction and peak/valley determinations to eliminate web flutter that often distorts the quantification of the mechanically embossed texture. The resulting profile may then be used to control a desired embossed profile.

7 Claims, 1 Drawing Sheet

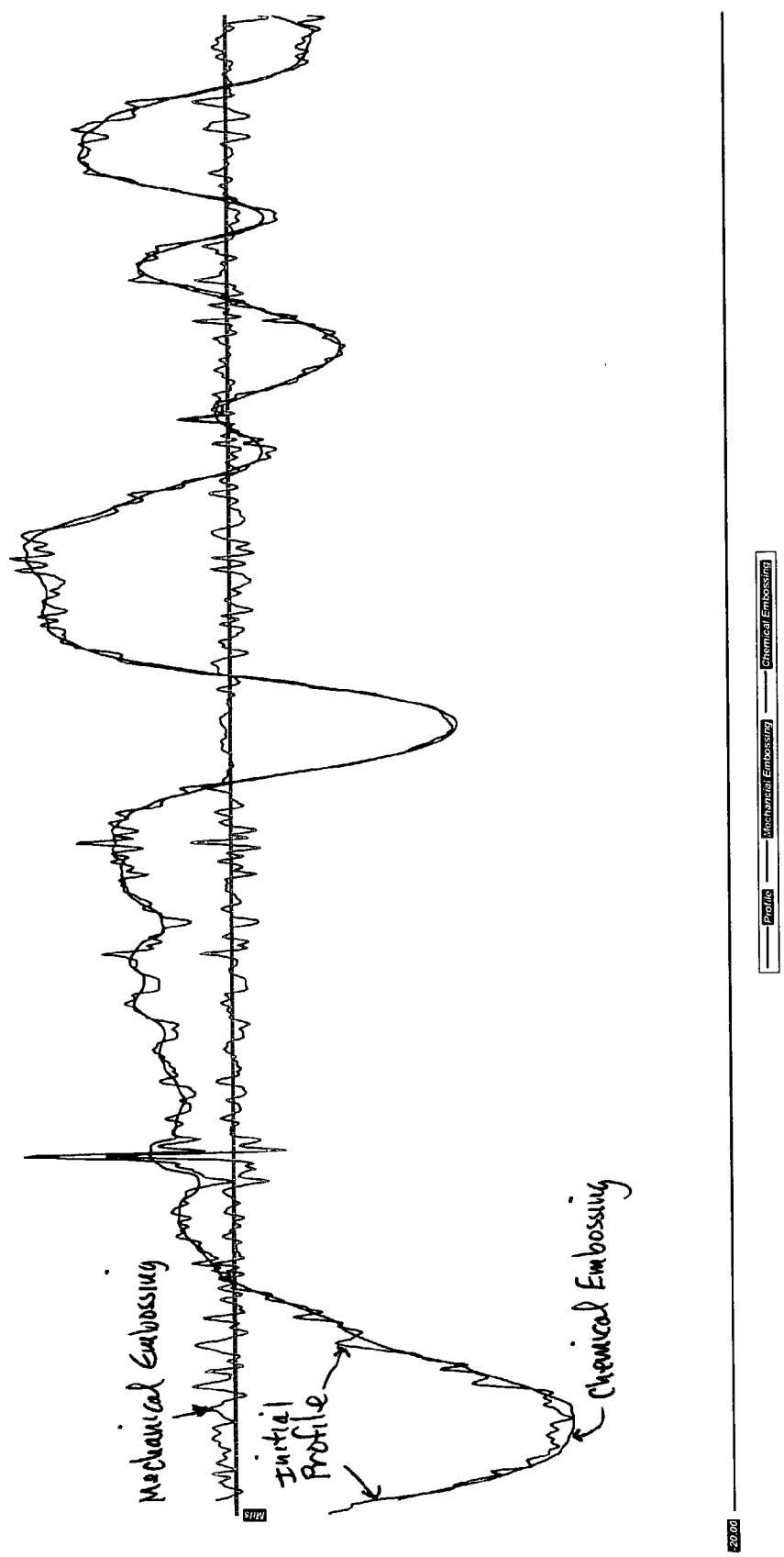

METHOD FOR PROCESS CONTROL OF MECHANICAL EMBOSSING TEXTURING

RELATED APPLICATION

This application is a non-provisional application claiming the benefit of Provisional Application Ser. No. 60/396,520, filed Jul. 17, 2002, the content of which is hereby incorporated in its entirety.

FIELD OF THE INVENTION

The present invention relates to a method and apparatus for measuring and controlling a mechanical embossed texture to provide control and consistency in embossing a texture.

BACKGROUND

Generally speaking, decorative laminates useful as surface coverings for floors are well known in the art and have achieved broad use in both domestic and commercial environments. For example, decorative laminates in the form of sheet material of a resinous polymer composition, e.g., polyvinyl chloride, on a suitable substrate, e.g., a fibrous backing sheet, have been used for many years as sheet flooring. A goal common to all manufacturers of sheet flooring is to provide flooring products having appealing surface decorative effects that are both attractive from an aesthetic viewpoint and useful from a functional standpoint. To illustrate, many methods and processes such as mechanical embossing, chemical embossing or inlaying have been utilized to provide contrasting surface finishes and thereby impart decorative effects to the sheet flooring. For example, U.S. Pat. Nos. 3,000,754, 3,121,642 and 4,298,646 each discloses different techniques or means for making floor-covering products such as floor tiles or sheet flooring having decorative surface effects.

Mechanically embossed textures often require adjusting during the process of forming the flooring. For example, mechanically embossed textures may not be desirable in chemical grout lines of the flooring tile design. Thus, the mechanical texturing of the grout lines must be adjusted out of the grout lines. Presently, the human eye is used in manufacturing lines to adjust the amount of mechanical embossing texture on vinyl sheet flooring. This subjective method is a leading cause of variation from run to run and operator to operator.

SUMMARY

The present invention includes both a method and apparatus for creating an embossed textured article. The method and apparatus include quantifying a surface texture on a textured article and extracting the mechanical and chemical embossing features from the random and uneven texture. The system provides for the non-subjective quantification of surface texture.

The method for creating an embossed textured article includes mechanically embossing a mechanically embossed texture into the article and then quantifying the mechanically embossed texture and determining a resulting profile. The resulting profile includes the peaks and valleys of the textured article which may be formed by the embossed texture. The mechanically embossed texture is controlled or set into the textured article such that the resulting profile corresponds to a predetermined optimum profile range.

In greater detail, the method can further include chemically embossing a surface texture onto the article and quantifying the chemically embossed surface texture to determine a profile of the embossed textured article. Both the mechanically embossed texture and the chemically embossed texture include valley features and peak features. Furthermore, the step of quantifying the mechanically embossed texture and the chemically embossed texture includes quantifying the valley features and peak features. The method can then include characterizing each valley feature and peak feature as chemically embossed or mechanically embossed and comparing each to corresponding predetermined values to determine validity of each feature.

The apparatus for mechanically embossing a substrate includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In greater detail, the profilometer may include a laser, a computer, and analysis software. The profilometer is capable of quantifying the mechanical embossed textures and chemical embossed textures and the analysis software is capable of differentiating between the chemical embossed textures and the mechanical embossed textures.

In a further embodiment, the method of making an embossed article includes measuring the surface texture profile of the article prior to mechanically embossing the article. The method then includes mechanically embossing the article and measuring the surface texture profile of the mechanically embossed article. The mechanically embossed texture may then be quantified and at least one process variable may be modified or adjusted to obtain an embossed texture profile within a desired range of textures. Such process variables can include the "wrap" time of the textured article, the nip spacing and the temperature of the textured article.

An additional embodiment includes a method for determining a profile of an embossed textured article having valley features and peak features. The method includes quantifying a mechanically embossed texture by determining an absolute depth of each valley feature and the distance between corresponding adjacent peak features. The method further includes quantifying the chemically embossed surface texture by determining an absolute depth of each valley feature and the distance between corresponding adjacent peak features. Next, the profile of the embossed textured article is determined from the quantified data.

DRAWINGS

In the drawings:

FIG. 1 illustrates a cross section of an embossed textured article illustrating the mechanically and chemically embossed areas and the resulting peak features and valley features.

DETAILED DESCRIPTION

The present invention is directed to both a method and apparatus for controlling and measuring an embossed texture on a decorative article. The embossed textured article comprises both peaks and valleys which are measured and quantified to determine a profile of the textured article. Typically, the textured article comprises both chemically and mechanically embossed areas. The method uses moving average subtraction and peak/valley determinations to eliminate web flutter that often distorts the quantification of the mechanically embossed texture. The resulting profile may then be used to set a desired embossed profile.

The term quantifying as used herein includes determining the number of features for a given distance on a textured article or surface covering. Features can be defined as the peaks and valleys found on a given textured article. Peaks are typically defined as the high points relative to the low points or valleys found on the textured article. In greater detail, the term quantifying can be further defined by the disclosed algorithm wherein the peaks and valleys are determined by implementing the first derivative over the filtered profile with the change in slope polarity used to find peaks and valleys.

The term profile can refer to a cross-sectional view of a textured article for a given distance or length of the textured article. The profile includes the cumulative number of peaks and valleys of a given length of textured article. Furthermore, the profile includes the distance between each feature or the distances between the valleys and peaks. Additionally, the profile includes the height of each peak and the depth of each valley.

The predetermined optimum profile is a profile selected to give the desired appearance of the textured article. For example, the optimum profile may be that profile that results in the chemically embossed areas having essentially no mechanically embossed surface texture and the remaining areas retaining the mechanically embossed surface texture. There are, of course, many such options for the predetermined optimum profile, and the determination of such is usually that profile that imparts the desired visual appearance upon the surface of the textured article.

The term softwear filters refers to any selected technique for analyzing the surface texture detail data and separating the selected data from the original data set. Software filters can include, but are not limited to, moving average, frequency, angle, low/high/bandpass filters, and subtraction of filtered profiles.

In greater detail, the present method includes creating an embossed textured article by mechanically embossing a mechanically embossed texture onto the article and quantifying the mechanically embossed texture and determining a resulting profile. The step of quantifying the mechanically embossed texture includes differentiating between a chemically embossed texture and the mechanically embossed texture. The mechanically embossed texture then is controlled such that the resulting profile corresponds to a predetermined optimum profile. Typically, the method is continuous.

Furthermore, the method for creating an embossed textured article may include both chemically and mechanically embossing a surface texture onto the article. Both the chemically and mechanically embossed areas are then quantified to determine a profile of the embossed textured article. The mechanically embossed texture and the chemically embossed texture includes valley features and peak features which also are quantified. The mechanically embossed texture then is controlled such that the profile of the embossed textured article corresponds to a predetermined optimum profile. Typically, the mechanically embossed texture is controlled by cooling the textured article at a predetermined rate to achieve the predetermined optimum profile.

The apparatus for mechanically embossing a substrate includes a cooled embossing roller and a backup roller operatively positioned with the embossing roller such that a nip is formed between the backup roller and the embossing roller whereby the substrate may pass through the nip and engage the embossing roller for imparting a mechanically embossed pattern. A profilometer is included that is capable of quantifying the mechanically embossed pattern. Any known profilometer with appropriate sensitivity may be used, including optical profilometers which include, but are not limited to, a vision system (camera, lighting, and a computer with analysis software) or a laser and a computer with analysis software. The profilometer quantifies the mechanical embossed textures and the chemical embossed textures, and the profilometer analysis software then differentiates between the chemically embossed textures and mechanically embossed textures. The wrap of the substrate around a portion of the cooled embossing roller may then be adjusted such that the mechanically embossed texture is controlled in the substrate, with the resulting profile of the substrate being substantially similar to an optimized profile.

In further detail, the present method and apparatus may quantify surface texture on vinyl flooring using a laser profilometer and software for extracting mechanical and chemical embossing features from the random, uneven, texture. Surface textures perceived by the human eye may be objectively quantified and the system can handle multiple (e.g., coarse, medium, fine, etc.) textures at the same time.

The software extracts chemical and mechanical surface texture depths, wall angles, and a number of associated features, and its strong correlation to the human eye. An important measurement is the number of mechanically embossed features per linear distance (e.g., more features equals more texture to the eye). Mechanical texture is typically fine and sharp, which greatly affects gloss. Due to the profilometer's sensitivity of 0.01 mils resolution, any movement or web flutter in the Z-axis of the web as it passes under the sensor would typically make it very difficult to measure mechanical features accurately. Typically, this high resolution is required to measure mechanical textures. This problem may be eliminated by using the moving average subtraction and peak/valley procedures. In essence, all low frequency variation (e.g. web flutter) is ignored resulting in a very reliable on-line measurement of textures. This system can be capable of measuring the amount of mechanical texture in a chemically restricted area (e.g., grout line) which can be important in achieving the desired visual.

For rotary mechanical embossing, the following variables can affect the desired surface texture:

1. Proper temperature and temperature gradient of the substrate to soften the surface to receive texture;
2. Sufficient nip pressure between embossing and backup rolls to impress texture; and
3. Sufficient substrate cooling while in contact with embossing roll to freeze-in the texture.

In one embodiment, variable substrate wrap around the cooled embossing roll is used to control the amount of mechanically embossed (ME) texture. With maximum wrap, the substrate can be sufficiently cooled to retain 100% of impressed texture. With zero wrap, the substrate may not be sufficiently cooled and most, if not all, impressed texture can completely fade away. Essentially, wrap controls the amount of texture fade-away.

The adjustment of the wrap is a fast and simple way to control texture for rotary mechanical embossing (ME) on vinyl sheet flooring. With accurate on-line texture measurement as feedback, the wrap control can be automated to insure consistent mechanical texture from run to run. Variable wrap control can be used on any rotary ME process that requires substrate cooling to freeze-in the image. An example of an apparatus capable for use in mechanically embossing a substrate can be found in U.S. Pat. No. 4,142,849, which is incorporated herein in its entirety.

The advantages of using variable wrap for texture control include quick control and immediate response to wrap change. Also, fine control is possible since large wrap changes can cause small texture change. Furthermore, 100% control and maximum texture to zero texture is possible depending upon process conditions.

In one embodiment, texture control can provide the ability to remove ME texture in the CE restricted areas. With the amount of wrap properly adjusted, ME texture impressed in the restricted areas can recover/rebound without major loss of texture in the unrestricted area.

Texture Measurement Hardware:

The texture measurement system consists of a laser profilometer (e.g., LMI Laser twin sensor, Model LTS 15/1) capable of measuring depth (i.e., distance from a surface to the laser head) with 0.00001-inch resolution with a spot size of 0.001" at a frequency up to 100 kHz. The analog output of the profilometer sensor and linear displacement encoder are inputs to a high-speed data acquisition system, such as the Sciemetric Model 270 Process Verification System, that records depth measurements every 0.002" of linear movement of the target. This provides the necessary surface profile data to be analyzed by the following feature extraction software.

Texture Measurement Software:

To extract and measure CE and ME features, the following process can be implemented in Excel, Visual Basic, or Sciemetric Inspexion software.

For CE Extraction:

Apply low pass filter to profile data. This can be done by using a moving average to smooth and eliminate all ME data. Also, commonly used Butterworth and Bessel filters can be applied.

For ME Extraction:

Apply high pass filter to profile data. This can be done by subtracting the original profile data from a moving average profile to eliminate all CE data. Also, commonly used Butterworth and Bessel filters can be applied.

The following is applied for both CE and ME measurements:
1. Find all the peaks and valleys by implementing the first derivative over the filtered profile. A change in slope polarity can be used to find peaks and valleys effectively;
2. Calculate all peak/valley and valley/peak depths;
3. Calculate all peak/valleys and valley/peaks linear sizes;
4. Validate CE/ME features (i.e., minimum and maximum depths and sizes);
5. Calculate average, maximum, and minimum depths and angles; and
6. Count number of CE and ME features per linear distance (i.e. feature frequency).

ME Texture Control:

The average of 30 or more ME feature count provides a reliable measurement of ME texture. The texture error (i.e., measured texture—setpoint texture) is removed by automatically adjusting the position of the embosser wrap roll and changing the amount of substrate wrap around the embossing roll. Electrical, pneumatic, hydraulic servos can be used for wrap roll position control.

Surface Texture Measurement System For Vinyl Sheet Flooring Description of Vinyl Floor Texture:

Surface texture in vinyl sheet flooring can be produced chemically, for example, by selectively restricting the expansion of the foamable (bottom) layer and mechanically by pressing a texture into the clear wear (top) layer. Chemical texture is generally deeper, larger, and less sharp than mechanical texture. An example of chemical texture is a grout area around a ceramic tile pattern. An example of mechanical texture is the fine wood ticking found in real wood grain. These textures, as they occur naturally, vary in shape, size, and distribution.

General Chemical Embossed (CE) texture characteristics used in current flooring products:
  Depth: about 5 to 25 mils
  Width: about 30 to 500 mils
  Wall Angle (angle relative to surface): about 5 to 20 degrees
  Frequency: about 0 to 5 features per 1 inch General Mechanical Embossed (ME) texture characteristics used in current flooring products:
  Depth: about 0.5 to 4 mils
  Width: about 5 to 15 mils
  Wall Angle (angle relative to surface): about 5 to 40 degrees
  Frequency: about 10 to 50 features per 1 inch Description of Measurement System:

Three fixed measurement points across a moving 12' wide sheet may be used to measure surface texture at the center and edges of the sheet. An incremental encoder will provide linear displacement of the sheet with a resolution on 0.0024"/pulse. Profiles may be taken every 5 feet of sheet travel for 2.45" (i.e., 1024 data points). At a line speed of 150 fpm, a new set of measurements will occur once every 2 seconds. Algorithms below may be applied to extract ten measurements from each of the three profiles for a total of 30 measurements. Each of the 30 measurements may be averaged over 10–30 profile sets before sending to an Allen Bradley PLC via DeviceNet or Data Highway. The PLC will provide a signal to enable/disable measurements.

Algorithm for Chemical Embossing:

Normalize the profile data by subtracting the profile average from each point.

Calculate a moving average at each point (e.g., the average of 10 points before and after).

Calculate the slope for each (moving average) point.

Determine peaks and valleys via slope/polarity change.

Calculate absolute value of depths by subtracting all peak/valley and valley/peak features.

Calculate run (i.e., distance from peak/valley and valley/peak) for each features.

Determine if feature meets criteria for chemical feature (i.e. min/max depth & run).

Calculate wall angle for each valid peak/valley and valley/peak using depth and run info.

Final Measurements

Calculate average of depths and angles.

Determine maximum depth and angle.

Count number of valid chemical features.

Algorithm for Mechanical Embossing:
  Normalize the sample data by subtracting each point from each moving-average point.
  Calculate the slope for each point.
  Determine peaks and valleys via slope/polarity change.
  Calculate absolute value of depths by subtracting all peak/valley and valley/peak features.
  Calculate run (i.e., distance from peak/valley and valley/peak) for each features.
  Determine if feature meets criteria for mechanical feature (i.e. min/max depth & run).
  Calculate angle for each valid peak/valley and valley/peak using depth and run info.

Final Measurements
  Calculate average depths and angles.
  Determine maximum depth and angle.
  Count number of valid mechanical features.

Parameters for System Configuration:
  Interval for moving average (number of points)
  Linear resolution in mils (encoder resolution)
  CE minimum rise in mils (must be>to be valid CE)
  CE maximum rise in mils (must be<to be valid CE)
  CE minimum run in mils (must be>to be valid CE)
  CE maximum run in mils (must be<to be valid CE)
  ME minimum rise in mils (must be>to be valid ME)
  ME maximum rise in mils (must be<to be valid ME)
  ME minimum run in mils (must be>to be valid ME)
  ME maximum run in mils (must be<to be valid ME)
  Number of profile measurements to average
  Minimum number of valid CE features (fewer features=no CE)
  Minimum number of valid ME feature (fewer features=no ME)

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method for determining a profile of an embossed textured article having fine texturing and coarse texturing, the texturing having valley features and peak features comprising:
  non-subjectively quantifying the fine texture by determining an absolute depth of a plurality of valley features and the distance between corresponding adjacent peak features or by determining an absolute depth of a plurality of valley features and the distance between adjacent peak and valley features of the fine texturing as the article is being embossed; and
  non-subjectively quantifying the coarse texture by determining an absolute depth of a plurality of valley features and the distance between corresponding adjacent peak features or by determining an absolute depth of a plurality of valley features and the distance between adjacent peak and valley features of the coarse texturing as the article is being embossed.

2. The method of claim 1, further including non-subjectively determining the validity of the plurality of valley features and peak features as the article is being embossed.

3. The method of claim 2, wherein non-subjectively determining the validity of the plurality of valley features and peak features includes comparing the quantified valley features and peak features to corresponding predetermined values as the article is being embossed.

4. The method of claim 1, further including non-subjectively determining the number of valid peak features and valid valley features in a predetermined segment of the article as the article is being embossed.

5. The method of claim 2, further including non-subjectively differentiating between the valid fine textured features and the valid coarse features as the article is being embossed.

6. The method of claim 1, further including non-subjectively characterizing the individual valley features and peak features as fine texturing or coarse as the article is being embossed.

7. The method of claim 6, wherein the characterization includes comparing the quantified valley features and peak features to predetermined value ranges as the article is being embossed.

* * * * *